(12) United States Patent
Emmerling et al.

(10) Patent No.: US 11,348,381 B2
(45) Date of Patent: May 31, 2022

(54) MOBILE IDENTIFICATION TRANSMITTER

(71) Applicant: Continental Automotive GmbH, Hannover (DE)

(72) Inventors: Ulrich Emmerling, Kelheim (DE); Annette Hebling, Geisling (DE); Christine Igl, Regensburg (DE); Georg Käufl, Painten (DE)

(73) Assignee: Continental Automotive GmbH

(*) Notice: Subject to any disclaimer, the term of this patent is extended or adjusted under 35 U.S.C. 154(b) by 143 days.

(21) Appl. No.: 16/638,048

(22) PCT Filed: Aug. 9, 2018

(86) PCT No.: PCT/EP2018/071668
§ 371 (c)(1),
(2) Date: Feb. 10, 2020

(87) PCT Pub. No.: WO2019/030340
PCT Pub. Date: Feb. 14, 2019

(65) Prior Publication Data
US 2020/0219334 A1    Jul. 9, 2020

(30) Foreign Application Priority Data

Aug. 11, 2017   (DE) .................. 10 2017 214 099.2

(51) Int. Cl.
*G07C 5/00*     (2006.01)
*H04W 4/40*    (2018.01)
(Continued)

(52) U.S. Cl.
CPC .............. *G07C 5/008* (2013.01); *B60L 58/12* (2019.02); *B60W 40/08* (2013.01); *H04W 4/40* (2018.02); *B60W 2040/0881* (2013.01)

(58) Field of Classification Search
None
See application file for complete search history.

(56) References Cited

U.S. PATENT DOCUMENTS

| 4,737,784 A | 4/1988 | Hirano |
| 9,518,408 B1 | 12/2016 | Krishnan |

(Continued)

FOREIGN PATENT DOCUMENTS

| CN | 103080985 A | 5/2013 |
| CN | 104395153 A | 3/2015 |

(Continued)

OTHER PUBLICATIONS

International Search Report and Written Opinion dated Nov. 26, 2018 from corresponding International Patent Application No. PCT/EP2018/071668.

*Primary Examiner* — James J Lee
*Assistant Examiner* — Andrew Sang Kim

(57) ABSTRACT

A mobile identification transmitter for an access arrangement of a vehicle, said access arrangement being supplied by a vehicle battery, comprises an identification-transmitter-side receiving device for receiving a vehicle-side request signal. Furthermore, it comprises an identification-transmitter-side transmitting device for emitting a response signal in response to the reception of the vehicle-side request signal. Finally, the mobile identification transmitter has an identification-transmitter-side control device for identifying and/or estimating the state of charge of the vehicle battery, for comparing the identified and/or estimated state of charge with a predetermined threshold value, and for identifying an emergency state of the access arrangement if the identified and/or estimated state of charge falls below the predetermined threshold value. If this is the case, then the identification-transmitter-side transmitting device can emit electromagnetic waves for charging a chargeable energy store for supplying the access arrangement. Simple and convenient emergency operation of the access arrangement is thus possible.

16 Claims, 1 Drawing Sheet

(51) Int. Cl.
*B60L 58/12* (2019.01)
*B60W 40/08* (2012.01)

(56) References Cited

U.S. PATENT DOCUMENTS

| | | | |
|---|---|---|---|
| 9,544,853 B1* | 1/2017 | Gu | H04W 4/80 |
| 2003/0004618 A1 | 1/2003 | Weigl | |
| 2012/0299721 A1 | 11/2012 | Jones | |
| 2013/0211623 A1* | 8/2013 | Thompson | B60L 3/0069 |
| | | | 701/2 |
| 2013/0226441 A1 | 8/2013 | Horita | |
| 2014/0316612 A1 | 10/2014 | Banter et al. | |
| 2015/0154816 A1 | 6/2015 | Chen et al. | |
| 2016/0340940 A1 | 11/2016 | Krishnan | |
| 2017/0089104 A1 | 3/2017 | Kowalewski et al. | |
| 2018/0080995 A1* | 3/2018 | Heinen | B60L 58/16 |
| 2018/0154866 A1* | 6/2018 | Sute | H02J 50/00 |

FOREIGN PATENT DOCUMENTS

| | | | |
|---|---|---|---|
| CN | 105548905 A | 5/2016 | |
| CN | 107016752 A | 8/2017 | |
| DE | 10015646 A1 | 10/2001 | |
| DE | 112013000504 T5 | 10/2014 | |
| EP | 2590146 A1 | 5/2013 | |
| WO | 99/28169 A1 | 6/1999 | |
| WO | 2011/147893 A1 | 12/2011 | |
| WO | 2014/081451 A2 | 5/2014 | |

\* cited by examiner

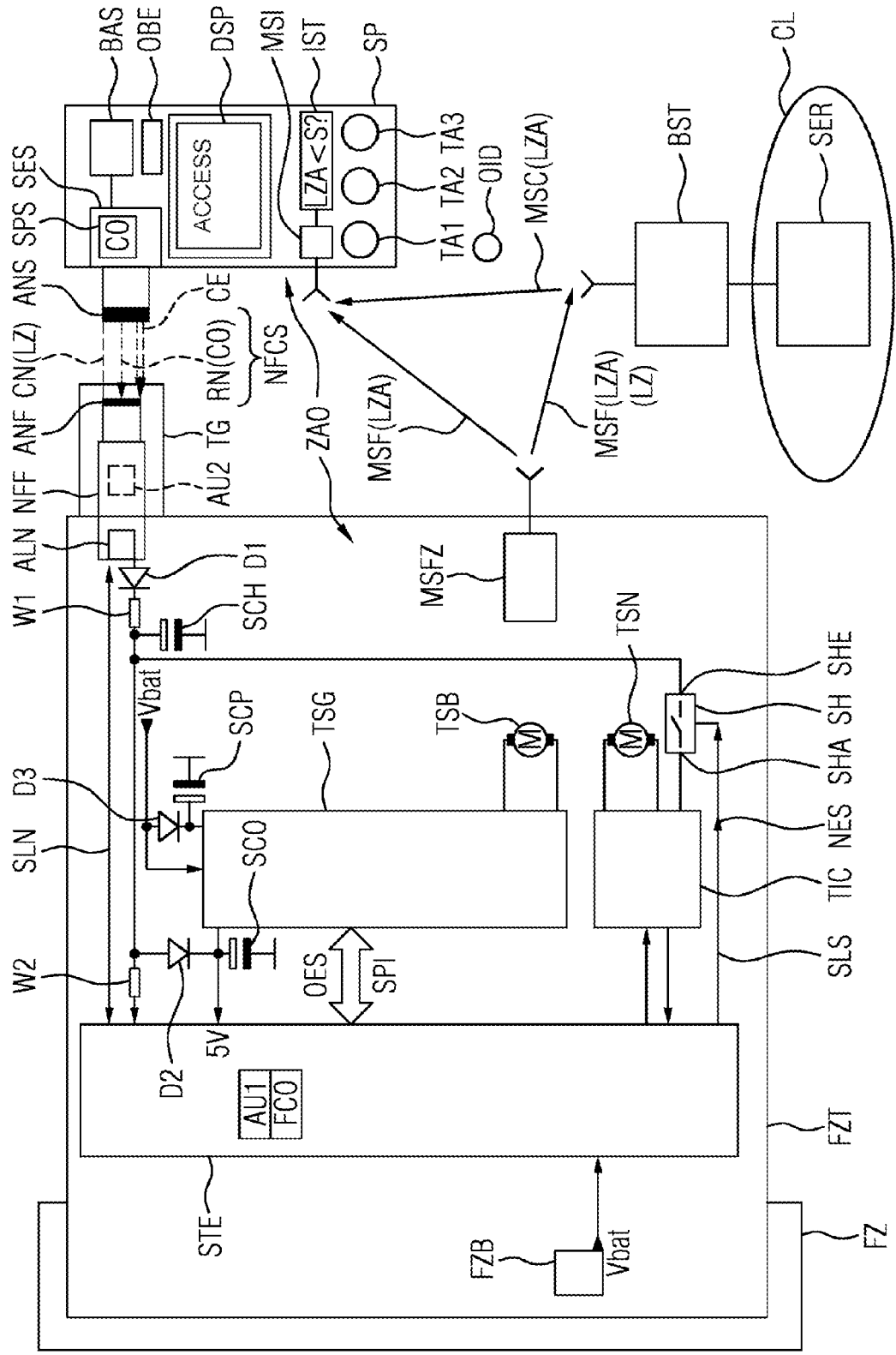

MOBILE IDENTIFICATION TRANSMITTER

The present invention relates to a mobile identification transmitter for an access arrangement of a vehicle, said access arrangement being supplied by a vehicle battery, in particular with the function of being able to carry out emergency unlocking of the vehicle in the event of failure of the vehicle battery. Furthermore, the invention relates to an access arrangement for a vehicle comprising a mobile identification transmitter just mentioned, and also a method for operating the mobile identification transmitter.

In order to prevent unauthorized access to a vehicle, particularly a motor vehicle, modern access authorization systems or access arrangements in vehicles use electronic security systems, in which to authenticate a user data communication takes place between a first communication device of the vehicle and a second communication device in a mobile identification transmitter of the user, such as a key or a key fob. In this case, in an active access arrangement of the mobile identification transmitter, control signals and an identification signal are transmitted to the vehicle, for example by the user of the mobile identification transmitter pressing a corresponding button, whereupon this vehicle is unlocked or locked if the identification code is correct.

In what is known as a passive access arrangement, request signals with a certain field strength are initially emitted at regular time intervals by a first communication device of the vehicle, in order to check whether a mobile identification transmitter is located in a proximity region or in an access region (unlock zone) around the vehicle. If a mobile identification transmitter approaches the vehicle and is finally able to receive the request signals thereof, it will respond to the reception of a request signal in order to initiate an authentication process. In this case, data messages are exchanged, in which the mobile identification transmitter ultimately communicates its authentication code in the vehicle. If the authentication code is checked successfully, it is then possible that a user, who is located directly at the vehicle in the access region, initiates unlocking of the corresponding vehicle door or all vehicle doors by actuating a door handle. As no active actuation of a mechanical or electrical identification transmitter or key by a user has to take place here, this type of access authorization checking is also termed passive access authorization checking and the corresponding access authorization systems are termed passive electronic access authorization systems or passive access arrangements.

As just mentioned, it is necessary, particularly for passive access arrangements, for a vehicle-side communication device to emit signals to the mobile identification transmitter of the user. However, this is no longer possible in the case where the on-board electrical system of the vehicle (fed by a vehicle battery) fails, said system generally supplying the vehicle-side communication device with energy. One possibility for failure can stem from the fact that the vehicle battery supplying the on-board electrical system is drained or no longer provides a sufficient voltage. For this purpose, it is conceivable to provide a mobile identification transmitter with a mechanical emergency key, which enables the vehicle to be opened by way of a mechanical closing device on the vehicle. In order that the closing device can be opened manually, such an emergency key can have, alongside the key bit, a sufficiently large key head in order that the torque required for opening the closing mechanism can be applied. However, a key head dimensioned in this way takes up a considerable structural space in the identification transmitter, with the result that, disadvantageously, the dimensions of the identification transmitter are crucially determined and enlarged by said emergency key or key head. Such a volume of an identification transmitter is usually undesirable, however, since in many cases the identification transmitter will also be kept in pockets of a user's clothes and thus result in the pockets becoming baggy.

The object of the present invention is thus to provide a possibility for identifying an emergency situation in the event of failure of the vehicle-side power supply in a simple and convenient manner and of being able to initiate access even without an emergency key.

This object is achieved by means of the subjects of the independent claims. The dependent claims relate to advantageous configurations.

In accordance with a first aspect of the invention, a mobile identification transmitter for an access arrangement of a vehicle, said access arrangement being supplied by a vehicle battery, is provided. The vehicle can be, in particular, a motor vehicle. In this case, the mobile identification transmitter has an identification-transmitter-side receiving device for receiving a vehicle-side request signal. Furthermore, it has an identification-transmitter-side transmitting device for emitting a response signal with an identification code in response to the reception of the vehicle-side request signal. This triggered emission of the identification code thus enables the mobile identification transmitter to be authenticated vis à vis the vehicle, with the result that the vehicle or the access arrangement, in the case of a correct identification code, can enable access to the vehicle, for example by the doors being unlocked. Finally, the mobile identification transmitter has an identification-transmitter-side control device designed for identifying and/or estimating the state of charge of the vehicle battery, for comparing the identified and/or estimated state of charge with a predetermined threshold value, and for identifying an emergency state of the access arrangement if the identified and/or estimated state of charge falls below the predetermined threshold value. By virtue of such a construction, the mobile identification transmitter has the opportunity independently to identify problems appertaining to the vehicle battery supplying the access arrangement, with the result that remedial measures can then be taken on the basis of this.

In addition, the identification-transmitter-side control device is furthermore configured to activate the identification-transmitter-side transmitting device for emitting (high-energy) electromagnetic waves for charging a vehicle-side chargeable energy storage device for supplying the access arrangement if it has identified the emergency state. In this case, the mobile identification transmitter not only independently identifies the emergency state, but itself enters an emergency mode and also immediately provides remedial action by emitting electromagnetic waves.

In accordance with a further configuration, it is also conceivable for the mobile identification transmitter to comprise an identification-transmitter-side output device for a user. Said output device makes it possible to output or to indicate signals perceptible to the user (such as optical signals, acoustic signals or mechanical signals, for example by means of vibration). Furthermore, in this configuration, the identification-transmitter-side control device is configured to activate the identification-transmitter-side output device if it has identified the emergency state. It is thus possible for the identification-transmitter-side control device either only to activate the output device in order to indicate the emergency mode or emergency state to the user and/or else to start the emission of the electromagnetic waves in order to charge the vehicle-side chargeable energy storage device for supplying the access arrangement.

It is furthermore conceivable for the identification-transmitter-side control device, upon the emergency state being identified, not only to output the presence of this state to the user but then to offer the user a user guide in particular by way of an optical display device and/or a loudspeaker, said user guide explaining to the user remedial measures and steps regarding how the user should then behave. The user guide can be realized by means of an application (APP) on the identification transmitter (in particular in the form of a smartphone). By way of example, the identification transmitter can then instruct the user to hold the identification transmitter at a specific point on the vehicle (such as the door handle) in order that an efficient transfer of energy from the identification transmitter to the vehicle is possible. Furthermore, the identification transmitter can regularly notify the user of the state of charge of the vehicle-side chargeable energy storage device and/or calculate a time when the vehicle-side chargeable energy storage device is sufficiently charged ready for properly supplying the access arrangement.

In accordance with a further configuration, the identification-transmitter-side receiving device is furthermore configured to receive information regarding the state of charge of the vehicle battery. In this case, it is possible for said information to be transmitted directly from the vehicle by means of a vehicle-side signal to the mobile identification transmitter or the receiving device thereof. This transmission of the information regarding the state of charge can be initiated for example by various events. It is conceivable for information to be transmitted when the vehicle is parked or the engine/motor is switched off. It is also conceivable to transmit the information when for example a door contact of the door on the driver's side is actuated, thereby indicating that the driver is getting out of the vehicle (with his/her mobile identification transmitter). It is also conceivable for the mobile identification transmitter to transmit a locking signal (after the driver has got out of the parked vehicle), whereupon the vehicle responds with a vehicle-side signal containing information regarding the state of charge of the vehicle battery. In the case of a passive access arrangement, it is also conceivable for a driver to actuate an operating element on the vehicle with the intention of locking, in response to which the vehicle emits the information regarding the current state of charge.

Besides the possibility of transmitting information regarding the state of charge of the vehicle battery from the vehicle directly to the mobile identification transmitter, there is also the possibility of the vehicle transmitting information regarding the state of charge of the vehicle battery via a long-range radio link, such as a mobile radio link, to a cloud or a server in a data network, such as the Internet. In this case, this transmission can take place at regular time intervals (for example daily). In said cloud or said server, therefore, the information regarding the state of charge of the vehicle battery is then stored, and can be retrieved as necessary by the mobile identification transmitter, or can be sent to the latter at regular time intervals. In this way, the mobile identification transmitter is likewise informed about the current state of charge of the vehicle battery.

In the case where the information regarding the state of charge is transmitted directly to the mobile identification transmitter, for example after a vehicle has been parked and the engine/motor has been switched off, the state of charge after the last vehicle use is thus transmitted to the mobile identification transmitter. If said mobile identification transmitter together with its user moves away from the vehicle and also remains away from the vehicle for a relatively long time, then the state of charge after the last vehicle use will no longer correspond to the current state of charge of the vehicle battery in the vehicle. Consequently, in accordance with one advantageous configuration, it is possible for the mobile identification transmitter or a corresponding identification-transmitter-side control device to be able to calculate or estimate the current state of charge on the basis of the state of charge since the last vehicle use, the time elapsed since the last vehicle use, and external environmental parameters such as the average outside temperature at the vehicle. In this way, as it were, a battery profile is created, by means of which the current state of charge is able to be estimated as well as possible in order to be able to assess the emergency state as well as possible and, if appropriate, to be able to initiate measures for the emergency mode.

In accordance with a further configuration, the mobile identification transmitter furthermore comprises an identification-transmitter-side sensor device configured to detect a sensor value, and to drive the identification-transmitter-side sensor device depending on the detected sensor value in order that said sensor device begins in particular with the comparison of the state of charge with the threshold value. Specifically, the identification-transmitter-side sensor device can comprise a location determining device, such as, for example, a satellite-based position determining device (such as a GPS=Global Positioning System), which detects the current location of the mobile identification transmitter, wherein the identification-transmitter-side sensor device drives the identification-transmitter-side control device (in particular with the comparison of the state of charge with a threshold value) if the location currently detected by the location determining device corresponds to a predetermined location. In this case, the predetermined location is, in particular, the expected location of the vehicle.

However, in accordance with a further configuration, it is also conceivable for the identification-transmitter-side sensor device to comprise an operating device (here a button) that is actuatable by a user, wherein the identification-transmitter-side sensor device drives the identification-transmitter-side control device (in particular for comparing the state of charge with the threshold value) if it has identified an actuation of the operating device.

In accordance with a further aspect of the invention, an access arrangement for a vehicle, in particular a motor vehicle, is provided, said access arrangement being supplied by a vehicle battery. In this case, the access arrangement has the following features. It has a mobile identification transmitter in line with a presentation in accordance with the explanation above. Furthermore, it can comprise a vehicle-side receiving device for receiving the electromagnetic waves emitted by the mobile identification transmitter, and for charging a vehicle-side chargeable energy storage device for supplying the access arrangement with the energy transmitted by the electromagnetic waves. In this way, an access arrangement is provided which, upon supply on the part of the vehicle battery, makes it possible to realize simple unlocking of the vehicle or simple access to the vehicle.

In accordance with one configuration of the access arrangement, the latter furthermore has a vehicle-side transmitting device for emitting information regarding the state of charge of the vehicle battery. As already mentioned above, said vehicle-side transmitting device can transmit the information regarding the state of charge either directly to the mobile identification transmitter or, in particular, by means of a long-range radio interface to a device in the Internet, such as a cloud or a server, in which the state of charge is then stored.

Particularly in the case where the information regarding the state of charge is transmitted directly, it is conceivable for the vehicle-side transmitting device to emit the information in response to the reception of an identification-transmitter-side request signal.

In accordance with one configuration, the mobile identification transmitter can be configured in such a way that it is able to be carried by a user and is embodied as a key, key fob, a cellular phone, in particular a smartphone (intelligent phone) or as a fitness tracker (fitness monitoring device, in particular worn around the wrist) etc. In this way, the user can use an object from his/her everyday life, for example, additionally to carry out emergency unlocking of the vehicle or an emergency mode of the access arrangement.

In accordance with a further aspect, provision is made of a method for operating a mobile identification transmitter for an access arrangement of a vehicle, said access arrangement being supplied by a vehicle battery, which access arrangement, in a first mode, receives a vehicle-side request signal and in response thereto emits an identification-transmitter-side response signal with an identification code. This reception of a request signal and response with an identification code can be part of an authentication process of the mobile identification transmitter at the vehicle in order that the access arrangement can (unlock one or more doors of the vehicle and) provide access to the vehicle in the case of a correct identification code. In this case, the method has the following steps. The state of charge of the vehicle battery of the vehicle is monitored. Furthermore, the mobile identification transmitter changes from the first mode to a second mode if the monitored state of charge of the battery has fallen below a predetermined threshold value. In this second state, the mobile identification transmitter identifies the emergency state, with the result that countermeasures can be initiated.

In accordance with one configuration of the method, in the second state, the mobile identification transmitter will emit (high-energy) electromagnetic waves for charging a vehicle-side chargeable energy storage device for supplying the access arrangement. In addition to or instead of emitting the electromagnetic waves, it is also conceivable that, in the case of the emergency state having been identified, the mobile identification transmitter outputs a corresponding user signal in order to inform the user about the emergency state of the access arrangement or the initiated emergency mode of the mobile identification transmitter.

In accordance with a further configuration of the method, it is conceivable for the state of charge of the vehicle-side chargeable energy storage device to be monitored during the emission of the electromagnetic radiation, wherein the vehicle or the access arrangement, as soon as a state of charge greater than a second predetermined threshold value is identified, emits a vehicle-side request signal to the mobile identification transmitter. Then, as in the case of the first mode, said vehicle-side request signal can initiate the beginning of an authentication process in which a response signal with an identification code is then also interrogated on the part of the mobile identification transmitter in order to actuate the access arrangement and, in particular, to unlock the vehicle.

Details and advantageous configurations of the mobile identification transmitter presented above, insofar as they are applicable moreover to the access arrangement and the method, should also be regarded as advantageous configurations of the access arrangement and of the method, and vice versa.

Exemplary embodiments of the present invention will now be explained in greater detail below with reference to the accompanying drawing. In the drawing:

FIG. 1 shows a schematic illustration of the essential components of an access arrangement for a vehicle comprising a mobile identification transmitter in accordance with one embodiment of the invention.

Reference shall now be made to FIG. 1, which shows an access arrangement ZAO designed for application in a vehicle, in particular a motor vehicle. In this case, the access arrangement ZAO comprises a vehicle-side part accommodated in the vehicle FZ, in particular in a door FZT of the vehicle. As can be seen on the right-hand side of the FIGURE, the access arrangement ZAO furthermore has a mobile part formed by a mobile identification transmitter, here in the embodiment of a smartphone (intelligent phone) SP.

During normal or proper operation of the access arrangement, during which a vehicle-side battery or vehicle battery FZB supplies an on-board electrical system with current, with the result that the essential components are supplied with the battery voltage Vbat, a vehicle-side control device STE (for example in the form of a microcontroller) will send a signal to a vehicle-side transmitting/receiving device via a control line SLN, said transmitting/receiving device then emitting request signals at regular time intervals. In the present case, the vehicle-side transmitting/receiving device is an NFC module or an NFC reader NFF, which is incorporated at least partly in a door handle TG of the vehicle door FZT. Said NFC reader NFF will then emit radio signals, in particular with a short range of approximately 10 cm, as request signals CN. In this case, these radio signals for request and also as response are in a frequency range of 13.56 MHz in accordance with an NFC standard.

It should be noted that it is also conceivable that the radio signals for request and also as response need not necessarily be in an NFC frequency range, but rather can also be in some other frequency range. In this regard, the radio signals can also be in a Bluetooth frequency range. Moreover, it is possible for the radio signals to be in a radio-frequency range at approximately 433 MHz. It may also be the case that request signals are in a different frequency range than the response signals; by way of example, the request signals can be at 125 kHz and the response signals at 433 MHz.

If a radio-technical counterpart, such as the smartphone SP, is then within range of the request signals CN, in a first mode it will receive said request signals CN and respond to them with one or more response signals RN. In order to exchange these request and response signals, on the vehicle side there is the vehicle-side (NFC) antenna ANF and on the part of the smartphone SP there is the smartphone-side (NFC) antenna ANS, which together form an NFC interface NFCS.

The request signals CN are received by the smartphone-side antenna ANS and conducted to a smartphone-side transmitting/receiving device SES. The latter comprises a storage device SPS, in which an identification code CO is stored. Said code is packaged into a response signal RN by the transmitting/receiving device SES, with the result that the identification code CO is transmitted back to the vehicle, more precisely to the antenna ANF. From there the code is conducted once again via the control line SLN to the vehicle-side control device STE, and there it is checked by an authentication section AU1. During this check, the identification code CO is compared with a code FCO stored in the authentication section AU1, wherein a positive result is obtained in the event of correspondence of the code.

In the event of a positive result of the check of the identification code CO being obtained, the control device STE outputs, via a vehicle bus SPI, a corresponding unlocking signal OES for proper unlocking to a door control unit TSG. In this case, the vehicle bus can be for example a so-called serial peripheral interface (SPI) bus.

The door control unit TSG is supplied, as indicated, with the battery voltage Vbat by the vehicle-side battery FZB via the on-board electrical system or a vehicle-side power supply. In this case the supply can take place directly or via a buffered input having a diode D3 and a buffer capacitor SCP. If the door control unit TSG receives the proper unlocking signal OES, then it will drive a motor TSB of a door lock of the vehicle door in order to unlock the vehicle door or a corresponding locking mechanism. It is also conceivable that, besides the door control unit TSG of the vehicle door FZT, further door control units are caused to unlock the corresponding door locks of further vehicle doors, and thus to allow a user to have access to the vehicle or to the passenger compartment.

Besides this normal or proper operation that takes place if the vehicle battery makes enough energy available, emergency operation is also conceivable in accordance with one embodiment of the present invention.

For this purpose of initiating emergency operation, reference shall now be made once again to the smartphone SP as a mobile identification transmitter of a user. Said smartphone SP is able to implement a plurality of software-based applications (or apps). By way of example, it is conceivable that a corresponding application can be started by means of one of the three buttons TA1, TA2 or TA3. In this case, the buttons can be embodied as mechanical buttons or as so-called soft keys (touch-sensitive sections of a display device). For monitoring and for overview for a user, the smartphone SP furthermore comprises a display DSP, on which information concerning the application currently being implemented can be seen. By way of example, it is conceivable that, as a result of the button TA1 being actuated, an application having the name "Access" is started and implemented, wherein the implementation of the application "Access" is confirmed precisely on the display DSP. This is conceivable not only for emergency operation but also for proper operation that has been described above.

While it is possible that during proper operation, after the application "Access" has been started, the smartphone SP has to be held against the door handle TG in order to exchange radio signals, it is conceivable that, for emergency operation, a user actuates the button TA2, for example, in order to activate emergency operation. However, it is also conceivable for the smartphone-side transmitting/receiving device SES to activate emergency operation independently, for example if it has not received a request signal CN from the vehicle-side antenna ANF within a specific time interval after the starting of the application "Access".

It is then assumed that, in one of the ways described above, the emergency function has been activated in the smartphone SP and the smartphone SP has been put into a second mode or emergency mode. Moreover, it is assumed, as shown in FIG. 1, that the smartphone SP is brought into the vicinity of the door handle TG by the user. In this case, the smartphone-side transmitting/receiving device SES fed by a smartphone-side battery BAS will then transmit electromagnetic energy in the form of the radio signals CE in the direction of the vehicle-side antenna ANF. Said antenna thus serves as a first section of a vehicle-side energy feed device for taking up wirelessly transmitted energy and for converting the transmitted energy into electrical energy. The NFC reader NFF, which can be regarded as the vehicle-side energy feed device, in emergency operation, is then not operated as a reader, but rather in a transponder mode, in which it takes up energy fed in (externally).

The NFC reader NFF furthermore has a second section ALN, which serves to charge a vehicle-side chargeable electrical energy storage device SCH in the form of a supercapacitor or ultracapacitor via a diode D1 and a resistor W1. In the example, said supercapacitor SCH has a voltage of 5 volts and a capacitance of 3.3 F.

While the smartphone-side transmitting/receiving device SES transmits high-energy radio waves CE (e.g. with a power of 100 mwatts) in the direction of the antenna ANF at regular (in particular short) time intervals (e.g. at intervals of 300-400 ms or else permanently for a specific time), this energy is converted further and the supercapacitor SCH is thereby charged. If a specific first state of charge is attained, then the vehicle-side control device STE can be supplied with sufficient voltage via a resistor W2. For a stable voltage supply over a specific time interval, it is also conceivable and merely optional to charge via the supercapacitor SCH a further capacitor, in particular embodied as a supercapacitor SCO, which is responsible only for safe or proper operation of the vehicle-side control device STE.

Since, as stated, the operation of the vehicle-side control device STE is then ensured either via the supercapacitor SCH or the supercapacitor SCO or by both supercapacitors, said vehicle-side control device can thus begin to initiate an authentication process vis à vis the smartphone SP. For this purpose, as above with regard to proper operation, via the control line SLN, a corresponding signal can be output to the NFC reader NFF, which thereupon begins with an exchange of request signals CN and response signals RNO and a corresponding exchange of the identification code CO. The identification code CO transmitted by the smartphone SP can then be checked again by the authentication section AU1. In this way, it is then conceivable that an authentication device in the form of the vehicle-side control device STE having the corresponding authentication section AU1 can be operated, despite failure of the on-board supply voltage, as a result of the charging of corresponding vehicle-side chargeable electrical energy stores (SCH, SCO).

It is then conceivable that even during the authentication process or independently thereof, the smartphone SP continues charging the supercapacitor SCH further by way of the radio signals CE, in particular with the purpose that said supercapacitor stores a sufficient amount of energy to carry out an emergency unlocking of the vehicle door FZT. However, it is also conceivable that the vehicle-side control device STE, after the activation, firstly carries out an authentication process vis à vis a smartphone and permits further charging of the supercapacitor SCH only in the event of a positive checking result (when it is established that the smartphone SP is associated with the access arrangement ZAO).

Independently of the way in which further charging of the supercapacitor SCH has occurred, it is then assumed that said supercapacitor has a state of charge sufficient to enable it to be used for an emergency unlocking. For this purpose, the vehicle-side control device STE is configured to constantly monitor the state of charge of the supercapacitor SCH. If there is then a first condition that an authentication of a smartphone SP placed against the door handle TG was positive, and if the further condition is present that the supercapacitor SCH has a sufficient state of charge, then the vehicle-side control device STE will output, via a control line SLS, an unlocking signal NES for emergency operation at a switch SH. Said switch, at whose input SHE the voltage of the supercapacitor SCH is present and whose output is connected to a driver circuit TIC, is closed by the unlocking signal for emergency operation NES, with the result that the energy stored in the supercapacitor passes to the driver circuit TIC. By way of the driver circuit TIC, a corresponding actuator or motor TSN will then carry out unlocking of the door lock or of a corresponding locking mechanism in order thus, even in the case of emergency operation, to achieve unlocking of the vehicle door FZT and to allow a user to have access to the interior of the vehicle.

While it has already been mentioned above that at the smartphone SP emergency operation or the second mode of the smartphone SP can be set for example by the actuation of the button TA2 as part of a smartphone-side sensor device, in order to transmit, by means of the smartphone SP, high-energy radio waves or electromagnetic waves CE to the vehicle for the purpose of charging the vehicle-side chargeable energy storage device SCH for the supply of the access arrangement, further possibilities for switching over to the second mode are also conceivable. By way of example, it is also possible for the smartphone SP to switch automatically into the emergency mode, the second mode, on account of individual parameters or a combination of specific parameters. One possibility consists in the smartphone SP monitoring the state of the vehicle battery FZB and creating, as it were, a "battery profile". In this context, it is conceivable that a present state of charge of the vehicle battery can be calculated or estimated from parameters such as the detected state of charge directly after the last vehicle use, the elapsed time since the last vehicle use, the outside temperatures prevailing at the vehicle, etc. If the smartphone estimates that the vehicle battery is empty or the state of charge has fallen below a specific threshold value S, then it can switch into a second mode (emergency mode), in which the user is made aware of the low state of charge of the vehicle battery or in which the smartphone scans for the vehicle cyclically via the short-range interface NFCS, and if the user holds the smartphone SP against the door handle, the smartphone SP identifies this (the vehicle-side transmitting/receiving device NFF then serves as a "tag" or transponder) and the vehicle-side transmitting/receiving device NFF is supplied with energy by the smartphone SP as a reader.

One possible embodiment that realizes the principle just illustrated for the identification of an emergency state of the access arrangement on the part of the smartphone SP will now be illustrated below once again with reference to FIG. 1. As already mentioned above, firstly for the purpose of authentication vis à vis the vehicle FZ, the smartphone SP can receive vehicle-side request signals CN by means of the smartphone-side transmitting/receiving device SES, whereupon the smartphone SP or the smartphone-side transmitting/receiving device returns an identification-transmitter-side response signal RN optionally together with a code CO. It is then conceivable that with the vehicle-side request signal CN, furthermore, the state of charge LZ since the last vehicle use of the vehicle battery FZB is also transmitted to the smartphone SP. This state of charge can then be stored in a memory of the identification-transmitter-side control device IST. By way of example, such a transmission of the state of charge LZ can take place if the smartphone SP issues a locking command, such that the vehicle then responds directly with the present state of charge.

It is furthermore conceivable for the state of charge of the vehicle battery to be transmitted via a different interface than the short-range interface NFCS from the vehicle to the smartphone SP. This can also take place for example via a long-range radio interface, such as a mobile radio interface. For this purpose, the vehicle FZ has a vehicle-side transmitting device MSFZ, via which it transmits a vehicle-side signal MSF with the present state of charge LZA of the vehicle battery FZB. In this case, such a vehicle-side signal NSF with the state of charge LZA can be received directly by an identification-transmitter-side mobile radio receiving device MSI and be forwarded to the identification-transmitter-side control device IST. This present received state of charge LZA is then checked in the identification-transmitter-side control device IST in respect of whether it is less than a predetermined threshold value S. If this is the case, then an emergency state is identified, in which the smartphone SP then operates, as it were, as a reader. For this purpose, it can then search for the vehicle-side transmitting/receiving device NFF, which is operated as a transponder in emergency operation, directly by the emission of identification-transmitter-side signals and, when it has found said device, can begin with the emission of high-energy electromagnetic waves CE for charging the vehicle battery FZB, as has been described above.

However, it is also conceivable for the vehicle-side mobile radio transmitting device NSFZ to send the state of charge LZA to a mobile radio base station BST in order to pass from there via a data network, such as the Internet, into a data cloud CL of a service provider. A data server SER of the service provider, connected to the mobile radio base station BST, shall be presented here by way of example for the cloud CL. One or a plurality of state of charge values LZA can then be stored in said cloud CL, said values being transmitted for example regularly by the vehicle-side mobile radio transmitting device MFSZ. In this regard, it is conceivable that the currently present state of charge from the vehicle is always stored in the cloud. It is conceivable here that, instead of regular emission of the state of charge LZA of the vehicle battery FZB, it is only upon specific events, such as upon the locking of the vehicle, that the currently present state of charge LZ at this point in time is transmitted to the cloud CL by means of the signal MSF. On the basis of this parameter LZ, and also the time elapsed since the reception of the parameter LZ (the last vehicle use), and also further parameters, such as the outside temperatures at the vehicle, in the cloud CL a battery profile can then be created in order to estimate therefrom always the present state of charge LZA.

On the part of the cloud CL or the base station BST connected thereto, either the currently present state of charge LZA or an estimated present state of charge can then be sent by means of a signal MSC from the cloud to the smartphone SP.

It is also conceivable for the smartphone SP or the smartphone-side control device IST thereof to be able to estimate the present state of charge LZA on the basis of the state of charge LZ after the last vehicle use by means of the parameters mentioned above, in order then, with the presently transmitted or estimated state of charge value, to be able to carry out the comparison with the first threshold value.

It is furthermore conceivable for the smartphone to undergo transition to a second mode (emergency mode) not just on the basis of the monitored state of charge, but rather to use further criteria therefor. By way of example, it is conceivable for the smartphone SP to comprise a sensor device in the form of a location determining device (e.g. a satellite-based location determining device), by means of which the smartphone can determine the present location of the smartphone. Consequently, a further criterion that can be used for the transition to the second mode is that the smartphone SP is situated at a predetermined location OID situated at a location directly in the vicinity of the vehicle FZ. In addition thereto, another criterion that can also be used for the transition to the second mode is that the smartphone SP is situated at the predetermined location OID and there it does not receive any request signals from the vehicle, even though the vehicle should have been expected there (this criterion or configurations thereof will be explained in even greater detail below). A safe and efficient switchover from the first to the second mode of the smartphone SP in conjunction with extremely good user convenience is made possible in this way.

It should once again be noted, finally, that in accordance with an access arrangement ZAO of the invention, a mechanical emergency key is no longer necessary in a mobile identification transmitter. Secondly, it is conceivable to enable an emergency unlocking even in the event of total failure of the on-board power supply of the vehicle. As a result of the charging of the supercapacitor SCH, therefore, both a vehicle-side authentication device in the form of the vehicle-side control device STE with its authentication section AU1 and a vehicle-side unlocking device in the form of the switch SH, the driver TIC and the actuator TSN are supplied with energy. In this way, the construction of the emergency device in terms of apparatus technology can be minimized since, in the minimum case, it is merely necessary to realize the supercapacitor SCH as a vehicle-side chargeable electrical energy storage device. Furthermore, the complexity in terms of method technology with regard to maintenance is also low since the supercapacitor does not have to be charged regularly during vehicle operation or a vehicle service in the workshop, but rather can be charged as necessary in the case of an emergency. Finally, as an advantage of the access arrangement in accordance with the embodiment of the present invention, it should be mentioned that for charging the supercapacitor SCH in emergency operation, it is possible to use an implement which is used by a user in daily life and which the user generally carries with himself/herself in a state ready for operation.

The invention claimed is:

1. A mobile identification transmitter for an access arrangement of a vehicle, said access arrangement being supplied by a vehicle battery, comprising:
    an identification-transmitter-side receiving device configured to receive a vehicle-side request signal;
    an identification-transmitter-side transmitting device configured to emit a response signal in response to reception of the vehicle-side request signal;
    an identification-transmitter-side control device configured to:
        at least one of identify and estimate a state of charge of the vehicle battery,
        compare the at least one of identified and estimated state of charge with a predetermined threshold value, and
        identify an emergency state if the at least one of identified and estimated state of charge falls below the predetermined threshold value,
    wherein the identification-transmitter-side control device is further configured to activate the identification-transmitter-side transmitting device to emit electromagnetic waves for charging a vehicle-side chargeable energy storage device if the identification-transmitter-side transmitting device identified the emergency state.

2. The mobile identification transmitter as claimed in claim 1 further comprising an identification-transmitter-side output device, wherein the identification-transmitter-side control device is further configured to activate the identification-transmitter-side output device if the identification-transmitter-side control device has identified the emergency state.

3. The mobile identification transmitter as claimed in claim 1, wherein the identification-transmitter-side receiving device is further configured to receive information regarding the state of charge of the vehicle battery.

4. The mobile identification transmitter as claimed in claim 1, wherein information about the state of charge comprises at least one of just current state of charge and the state of charge after last vehicle use.

5. The mobile identification transmitter as claimed in claim 3, wherein the identification-transmitter-side control device estimates current state of charge based on the received information regarding the state of charge since last vehicle use.

6. The mobile identification transmitter as claimed in claim 1, further comprising an identification-transmitter-side sensor device configured:
    to detect a sensor value, and
    to drive the identification-transmitter-side control device depending on the detected sensor value.

7. The mobile identification transmitter as claimed in claim 6, wherein the identification-transmitter-side sensor device comprises a location determining device configured to detect current location of the mobile identification transmitter, wherein the identification-transmitter-side sensor device drives the identification-transmitter-side control device if the current location corresponds to a predetermined location.

8. The mobile identification transmitter as claimed in claim 6, wherein the identification-transmitter-side sensor device comprises an operating device actuatable by a user, wherein the identification-transmitter-side sensor device drives the identification-transmitter-side control device if the identification-transmitter-side sensor device identified an actuation of the operating device.

9. The mobile identification transmitter as claimed in claim 1, comprised in at least one of a key, a key fob, a cellular phone, a smartphone and a fitness tracker.

10. An access arrangement for the vehicle, said access arrangement being supplied by the vehicle battery, comprising:
    the mobile identification transmitter as claimed in claim 1;
    a vehicle-side receiving device configured to receive the electromagnetic waves emitted by the mobile identification transmitter, and
    further configured to charge the vehicle-side chargeable energy storage device configured to supply the access arrangement with energy transmitted by the electromagnetic waves.

11. The access arrangement as claimed in claim 10, further comprising a vehicle-side transmitting device configured to emit information regarding the state of charge of the vehicle battery.

12. The access arrangement as claimed in claim 11, wherein the vehicle-side transmitting device emits the information regarding the state of charge in response to the reception of an identification-transmitter-side signal.

13. A method for operating a mobile identification transmitter for an access arrangement of a vehicle, said access arrangement being supplied by a vehicle battery, wherein the mobile identification transmitter, in a first mode, receives a vehicle-side request signal and, in response thereto, emits a response signal with an identification code, the method comprising:

monitoring a state of charge of the vehicle battery of the vehicle;

identifying an emergency state if the monitored state of charge of the vehicle battery has fallen below a predetermined threshold value, and changing the mobile identification transmitter from the first mode to a second mode, wherein electromagnetic waves for charging a vehicle-side chargeable energy storage device are emitted in the second mode.

14. The method as claimed in claim 13, wherein the mobile identification transmitter, in the second mode, emits electromagnetic waves configured to charge the vehicle battery.

15. The method as claimed in claim 13, wherein the mobile identification transmitter, in the second mode, outputs user information regarding the identified emergency state.

16. The method as claimed in claim 13, wherein monitoring the state of charge of the vehicle battery is carried out by the mobile identification transmitter.

* * * * *